United States Patent
Lee et al.

(10) Patent No.: US 9,491,426 B2
(45) Date of Patent: Nov. 8, 2016

(54) SCANNING PROJECTION SYSTEM

(71) Applicant: LITE-ON TECHNOLOGY CORPORATION, Taipei (TW)

(72) Inventors: Chang-Feng Lee, Taipei (TW); Chun-Po Hsu, Taipei (TW); De-Jian Ou, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 137 days.

(21) Appl. No.: 14/595,691

(22) Filed: Jan. 13, 2015

(65) Prior Publication Data
US 2015/0215591 A1    Jul. 30, 2015

(30) Foreign Application Priority Data

Jan. 29, 2014   (CN) .......................... 2014 1 0043781

(51) Int. Cl.
*G03B 21/20* (2006.01)
*H04N 9/31* (2006.01)

(52) U.S. Cl.
CPC ........ *H04N 9/3182* (2013.01); *G03B 21/2033* (2013.01); *H04N 9/3129* (2013.01); *H04N 9/3135* (2013.01)

(58) Field of Classification Search
CPC ............. H04N 9/3135; H04N 9/3129; H04N 9/3132; H04N 9/3161; H04N 9/3164; H04N 9/3185; H04N 9/3188; H04N 9/3179; H04N 9/3182; G03B 21/147; G03B 21/14; G03B 21/28; G03B 21/2013; G03B 21/2033
See application file for complete search history.

(56) References Cited

U.S. PATENT DOCUMENTS

2012/0120116 A1*  5/2012  Seo .................. H04N 9/3135
                                                       345/690

* cited by examiner

*Primary Examiner* — William C Dowling
*Assistant Examiner* — Ryan Howard
(74) *Attorney, Agent, or Firm* — WPAT, PC; Justin King

(57) ABSTRACT

A scanning projection system includes a scanning mirror module, a controlling circuit, and a laser module. A swinging motion of the scanning mirror module is controlled according to a driving signal, and a combined laser beam reflected by the scanning mirror module is swept across a projection surface to produce plural projection points on a projection surface. The controlling circuit includes a weight mapping unit for converting an image signal into a compensated image signal according to a position-and-weight mapping relationship. The laser module generates the combined laser beam according to the compensated image signal. After plural weights of the corresponding projection points are acquired according to positions of the corresponding projection points and the position-and-weight mapping relationship, the weight mapping unit multiplies the image signal by the corresponding weights according to the positions of the projection points. Consequently, the compensated image signal is generated.

9 Claims, 6 Drawing Sheets

SCANNING PROJECTION SYSTEM

This application claims the benefit of People's Republic of China Application Serial No. 201410043781.2, filed Jan. 29, 2014, the subject matter of which is incorporated herein by reference.

FIELD OF THE INVENTION

The present invention relates to a projection system, and more particularly to a scanning projection system for producing a frame with uniform brightness.

BACKGROUND OF THE INVENTION

Projectors are widely used in many circumstances. Recently, with increasing development of science and technology, a pico projector has been introduced into the market. The pico projector is designed to have small size and light weightiness. The pico projector may produce projection images by different projecting technologies. For example, in a scanning projection system, a two-dimensional scanning mirror is used to periodically sweep a laser beam across a projection surface in order to produce the projection image on the projection surface.

FIG. 1A schematically illustrates the architecture of a conventional scanning projection system. As shown in FIG. 1A, the scanning projection system 100 comprises a laser module 151, a scanning mirror module 152, and a controlling circuit 153. The laser module 151 comprises plural color laser sources 122~124 and plural optical alignment elements 155. The plural color laser sources 122~124 are used for emitting plural color beams, respectively. By the plural optical alignment elements 155, the plural color beams from the plural color laser sources 122~124 are mixed as a combined laser beam 154. Then, the combined laser beam 154 is reflected by the scanning mirror module 152, and projected on a projection surface 140. For example, the plural color laser sources 122~124 are used for emitting a red beam, a green beam and a blue beam, respectively. Moreover, the scanning mirror module 152 is a microelectromechanical (MEMS) scanning mirror module.

Moreover, the controlling circuit 153 is used for outputting an image signal V to the laser module 151 and outputting a driving signal D to the scanning mirror module 152.

Please refer to FIG. 1A again. The swinging motion of the scanning mirror module 152 is controlled according to the driving signal D. Consequently, the projection points of the combined laser beam 154 are swept across the projection surface 140 by scanning each row of pixels from left to right and then from right to left and scanning rows from top to bottom. Generally, the start point of the scanning cycle is at an upper left corner of the projection surface 140, and the end point of the scanning cycle is at a lower right corner of the projection surface 140. According to the image signal V, the combined laser beam 154 with the corresponding image setting is projected on the corresponding scanning position during the swing of the laser module 151. After one scanning cycle is completed, a frame is displayed on the projection surface 140. Then, the projection point goes back to the start point (e.g. the upper left corner), and the next scanning cycle is performed to display the next frame.

Generally, the number of frames to be displayed every second is defined as a frame rate. For example, if the frame rate of the projection surface 140 is 60, it means that 60 scanning cycles are performed per second and 60 frames are continuously displayed on the projection surface 140 per second.

FIG. 1B is a schematic timing waveform diagram illustrating associated driving signals of the conventional scanning projection system. The driving signal D contains a fast-axis driving signal and a slow-axis driving signal. According to the fast-axis driving signal, the swinging motion of the scanning mirror module 152 along a fast-axis direction (e.g. a horizontal scanning direction or an x-axis direction) is correspondingly controlled. According to the slow-axis driving signal, the swinging motion of the scanning mirror module 152 along a slow-axis direction (e.g. a vertical scanning direction or a y-axis direction) is correspondingly controlled.

Please refer to FIG. 1B. At the time point t0, the scanning cycle of a first frame (frame1) is started. The time interval between two troughs of the fast-axis driving signal indicates one back-and-forth swinging motion of the scanning mirror module 152 along the horizontal scanning direction. The time interval between two troughs of the slow-axis driving signal indicates one back-and-forth swinging motion of the scanning mirror module 152 along the vertical scanning direction. Consequently, from the time point t0 to the time point t2, the first frame (frame1) is displayed on the projection surface 140. At the time point t1, the scanning cycle of a first frame (frame1) is ended. The time interval between the time point t1 and the time period t2 indicates the time period from the end point of the scanning cycle of the first frame (frame1) to the start point of the scanning cycle of a second frame (frame 2).

Similarly, the second frame (frame2) is displayed on the projection surface 140 from the time point t2 to the time point t3; and a third frame (frame3) is displayed on the projection surface 140 from the time point t3 to the time point t4.

As shown in FIG. 1B, the fast-axis driving signal may drive a fast-axis swinging motion of the scanning mirror module 152 along the horizontal scanning direction at a resonant frequency. Consequently, the scanning mirror module 152 is periodically swung in a sine-like wave form. Due to the sine-like fast-axis swinging motion, the projection points of the combined laser beam 154 are swept across the projection surface 140 at a non-constant velocity. The distance between every two adjacent projection points is not constant under the non-constant velocity, therefore the brightness of the frame is not uniform.

FIGS. 2 and 3 schematically illustrate the frame displayed on the projection surface of the conventional scanning projection system. As shown in FIG. 2, the distribution of the projection points at a left side 242 and a right side 244 of the projection surface 140 is denser, and thus the frame brightness presented at two side of the projection surface 140 is higher. Moreover, the distribution of the projection points at a middle region of the projection surface 140 is sparser, and thus the frame brightness presented at the middle region of the projection surface 140 is lower. In other words, the brightness values presented at the left side and the right side of the whole frame are higher, and the brightness value presented at the middle region of the whole frame is lower.

As shown in FIG. 1B, the slow-axis driving signal in the sawtooth wave form may drive the swinging motion of the scanning mirror module 152 in a periodic sawtooth wave form. However, due to the physical properties of the scanning mirror module 152, some drawbacks may occur. For example, when the slow-axis driving signal in the sawtooth wave form drives the slow-axis swinging motion of the scanning mirror module 152 along the vertical scanning direction, the scanning mirror module 152 may be suffered from jitter. Consequently, the frame brightness presented along the vertical scanning direction is non-uniform.

In particular, due to the physical properties of the scanning mirror module 152, the slow-axis driving signal fails to ideally drive the swinging motion of the scanning mirror module 152 at a constant velocity. Under this circumstance, the scanning mirror module 152 may be slightly suffered from jitter. Since the swinging motion of the scanning mirror module 152 is not ideally maintained at the constant velocity, some drawbacks may occur. For example, if the swinging speed is decreased, the distance between two adjacent scan lines is reduced, and thus the scan lines present bright. As shown in FIG. 3, if the swinging velocity of the scanning mirror module 152 along the vertical scanning direction and corresponding to a specified region 342 of the projection surface 140 is slower, the distribution of the scan lines at the specified region 342 of the projection surface 140 becomes denser. Consequently, the scan lines at the specified region 342 of the projection surface 140 present brighter than other region.

From the above discussions about the conventional scanning projection system, the brightness values presented at the left side and the right side of the whole frame are higher, and the scan lines at the middle region of the projection surface present brighter. Consequently, the user's eyes usually feel uncomfortable with the non-uniform brightness.

Due to the characteristics of the swinging motion or the characteristics of the driving signal, the projection points of the combined laser beam 154 are swept across the projection surface 140 at the non-constant velocity, and thus the distribution of the projection points are non-uniform. Moreover, if the optical path of the combined laser beam 154 to the projection surface 140 is adversely affected by other optical elements in the optical path, the projecting direction of the combined laser beam 154 is possibly shifted. That is, the positions of the projection points on the projection surface 140 are deviated. Under this circumstance, the distribution of the projection points on the projection surface 140 is not uniform. Consequently, the presented brightness of the frame on the projection surface 140 is not uniform.

SUMMARY OF THE INVENTION

The present invention provides a scanning projection system for producing a frame with uniform brightness.

An embodiment of the present invention provides a scanning projection system for displaying a frame on a projection surface. The scanning projection system includes a scanning mirror module, a controlling circuit, and a laser module. A swinging motion of the scanning mirror module is controlled according to a driving signal, and a combined laser beam reflected by the scanning mirror module is swept across a projection surface to produce plural projection points on the projection surface. The controlling circuit includes a weight mapping unit for converting an image signal into a compensated image signal according to a position-and-weight mapping relationship. The laser module generates the combined laser beam according to the compensated image signal. After plural weights of the corresponding projection points are acquired according to positions of the corresponding projection points and the position-and-weight mapping relationship, the weight mapping unit multiplies the image signal by the corresponding weights according to the positions of the projection points to generate the compensated image signal.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
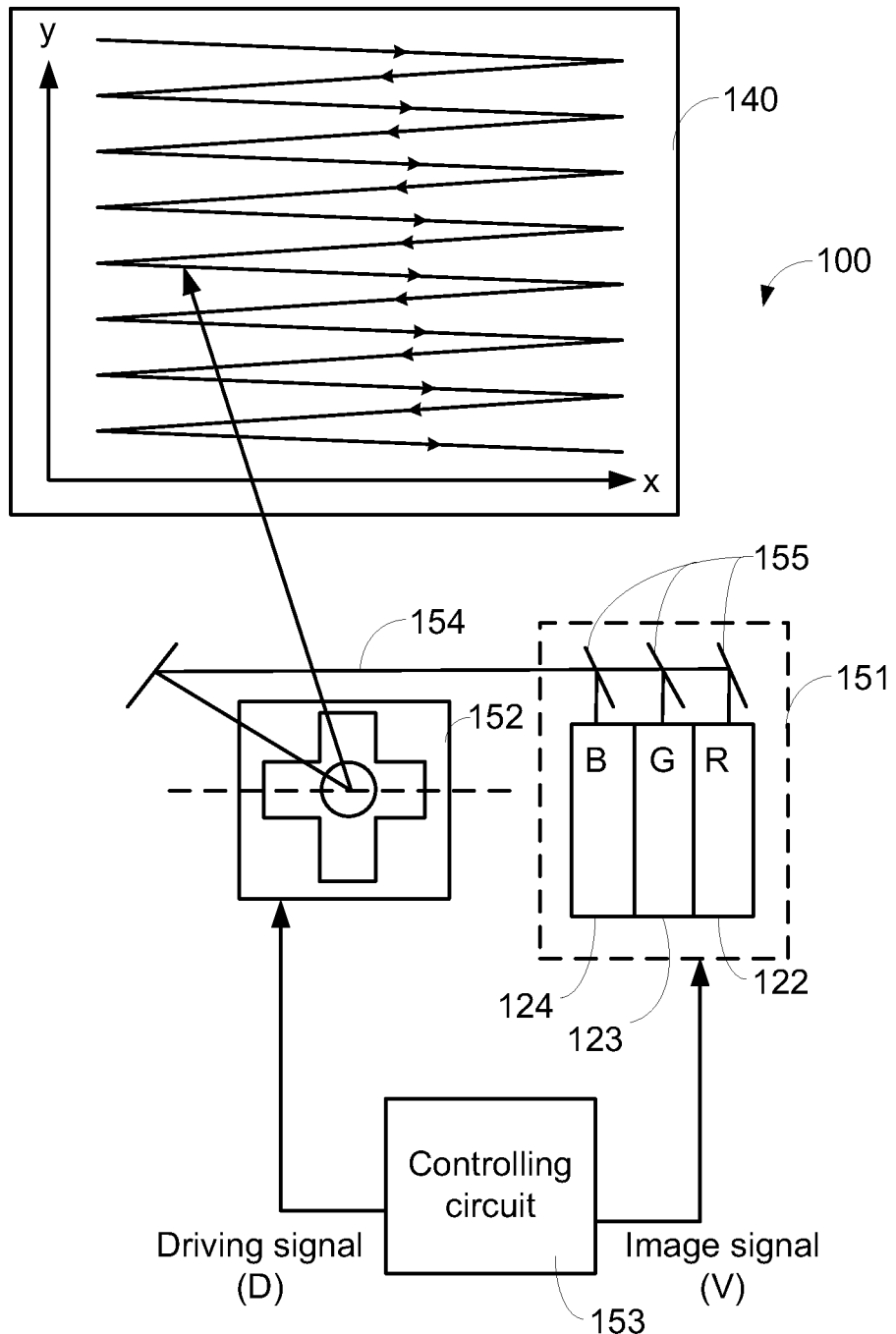
FIG. 1A (prior art) schematically illustrates the architecture of a conventional scanning projection system.
Figure 1B:
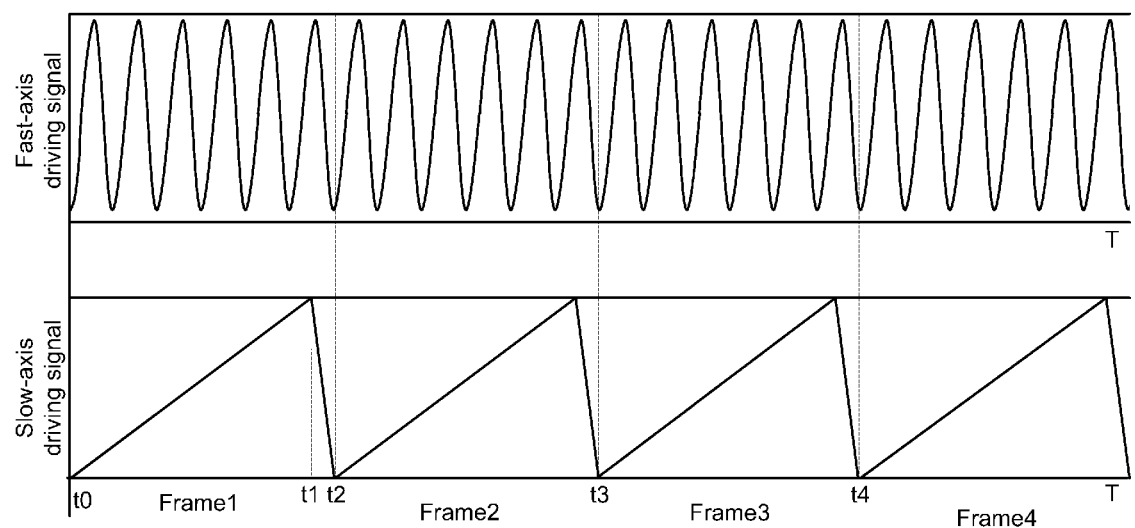
FIG. 1B (prior art) is a schematic timing waveform diagram illustrating associated driving signals of the conventional scanning projection system.
Figure 2:
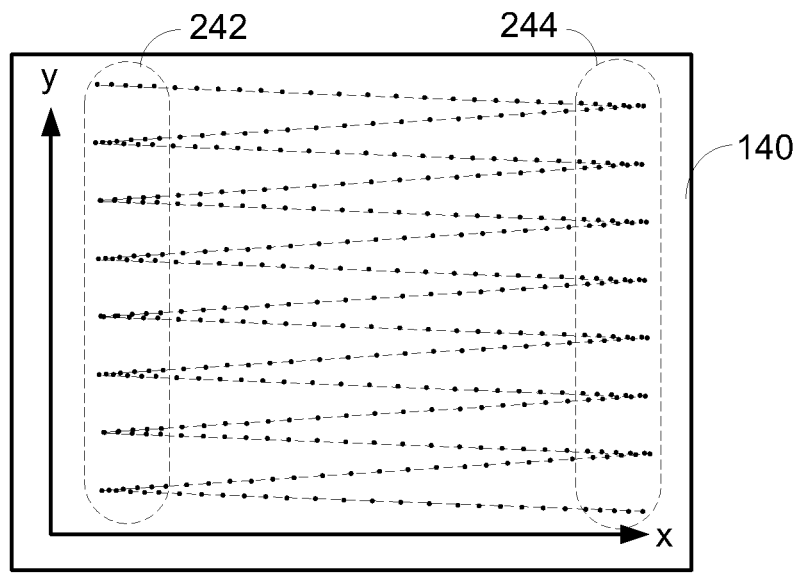
FIGS. 2 and 3 (prior art) schematically illustrate the frame displayed on the projection surface of the conventional scanning projection system.
Figure 3:
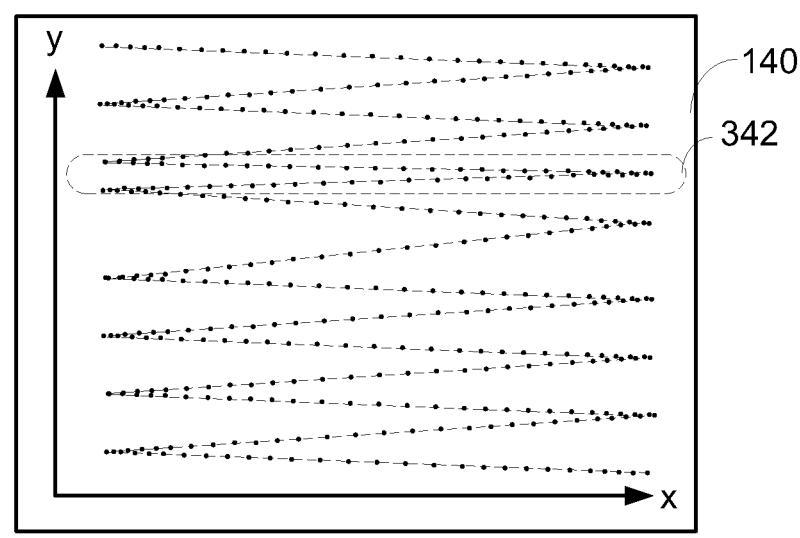
Figure 4:
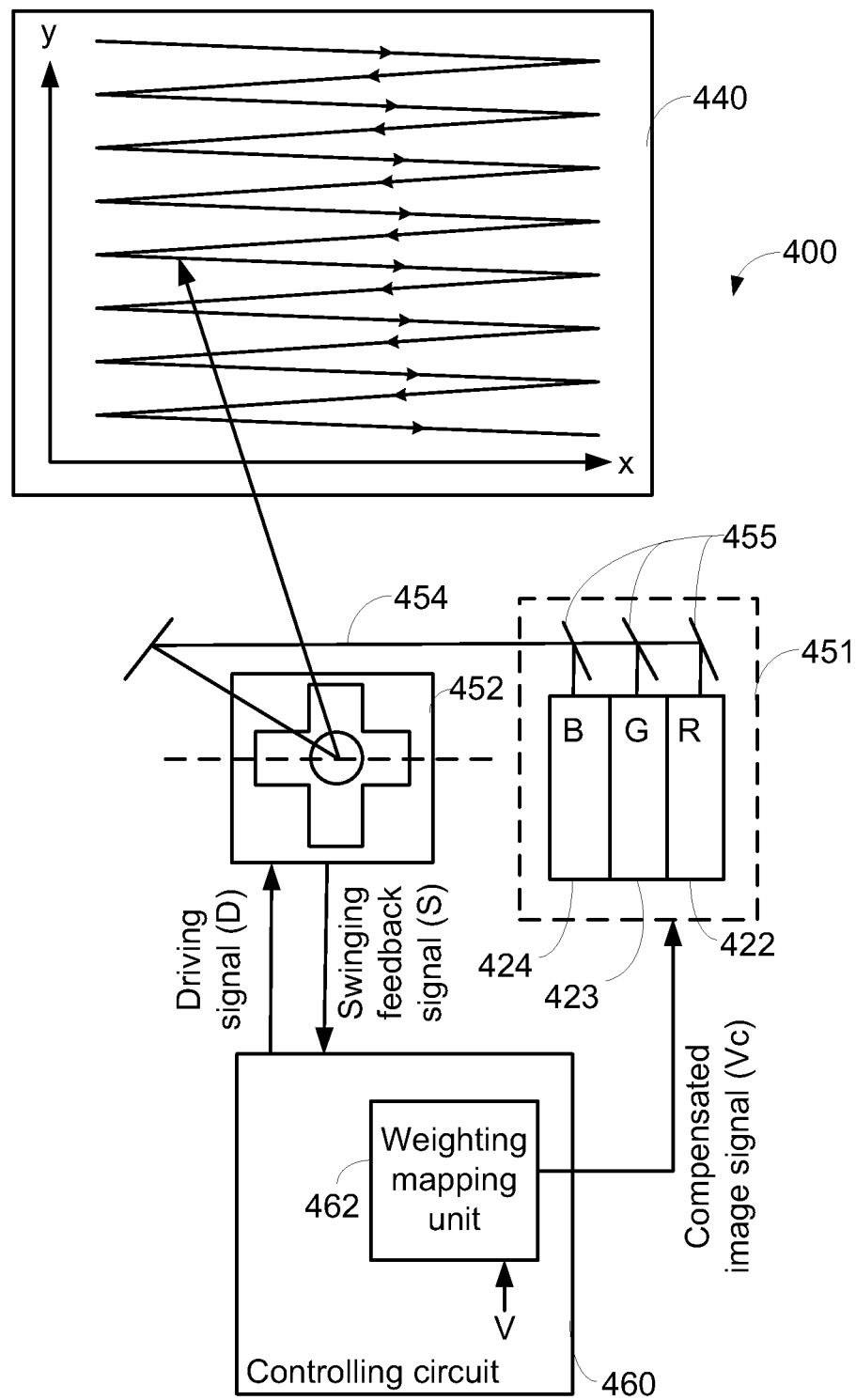
FIG. 4 schematically illustrates the architecture of a scanning projection system according to an embodiment of the present invention.

FIG. 4 schematically illustrates the architecture of a scanning projection system according to an embodiment of the present invention. As shown in FIG. 4, the scanning projection system 400 comprises a laser module 451, a scanning mirror module 452, and a controlling unit 460. The laser module 451 comprises plural color laser sources 422~424 and plural optical alignment elements 455. The plural color laser sources 422~424 are used for emitting plural color beams, respectively. By the plural optical alignment elements 455, the plural color beams from the plural color laser sources 422~424 are mixed as a combined laser beam 454. Then, the combined laser beam 454 is reflected by the scanning mirror module 452, and projected on a projection surface 440. For example, the plural color laser sources 422~424 are used for emitting a red beam, a green beam and a blue beam, respectively. Moreover, the scanning mirror module 452 is a microelectromechanical (MEMS) scanning mirror module.

The controlling circuit 460 may generate a driving signal D to the scanning mirror module 452 in order to drive a swinging motion of the scanning mirror module 452. Moreover, a swinging feedback signal S corresponding to a swinging status of the scanning mirror module 452 may be received by the controlling circuit 460. Similarly, the driving signal D contains a fast-axis driving signal and a slow-axis driving signal. Moreover, the controlling circuit 460 comprises a weight mapping unit 462 for deriving the position-and-weight mapping relationship. Moreover, according to the position-and-weight mapping relationship, the weights corresponding to the positions of projection points are acquired by the controlling circuit 460. After the weights corresponding to the positions of projection points are acquired, the controlling circuit 460 converts an image signal V into a compensated image signal Vc and transmits the compensated image signal Vc to the laser module 451. According to the compensated image signal Vc, the combined laser beam 454 with the corresponding image setting is projected on the corresponding scanning position during the swing of the laser module 451.

In an embodiment, an infrared photographing technology may be used to detect the positions of the projection points on the projection surface 440. According to the positions of the projection points on the projection surface 440, the weight mapping unit 462 may simulate the scanning trajectory of the combined laser beam 454 that is reflected by the scanning mirror module 452 and projected on the projection surface 440. Moreover, according to the simulated scanning trajectory, the weight mapping unit 462 may evaluate the positions of the projection points and the distances between the projection points. Moreover, according to the distribution (also referred as closeness or sparseness) of the projection points, the weight mapping unit 462 may derive the position-and-weight mapping relationship. In another embodiment, according to the swinging feedback signal S, the weight mapping unit 462 may simulate the swinging trajectory of the scanning mirror module 452 and evaluate the positions of the projection points and the distances between the projection points. Consequently, the weight mapping unit 462 may derive the position-and-weight mapping relationship.

Hereinafter, the position-and-weight mapping relationship along the horizontal scanning direction and the position-and-weight mapping relationship along the vertical scanning direction will be separately illustrated. In some other embodiments, the position-and-weight mapping relationship along both of the horizontal scanning direction and the vertical scanning direction may be taken into consideration. After the weights corresponding to all projection points are determined, the non-uniform presentation resulting from the closeness or sparseness of the projection points along both of the horizontal scanning direction and the vertical scanning direction will be compensated.

Figure 5:
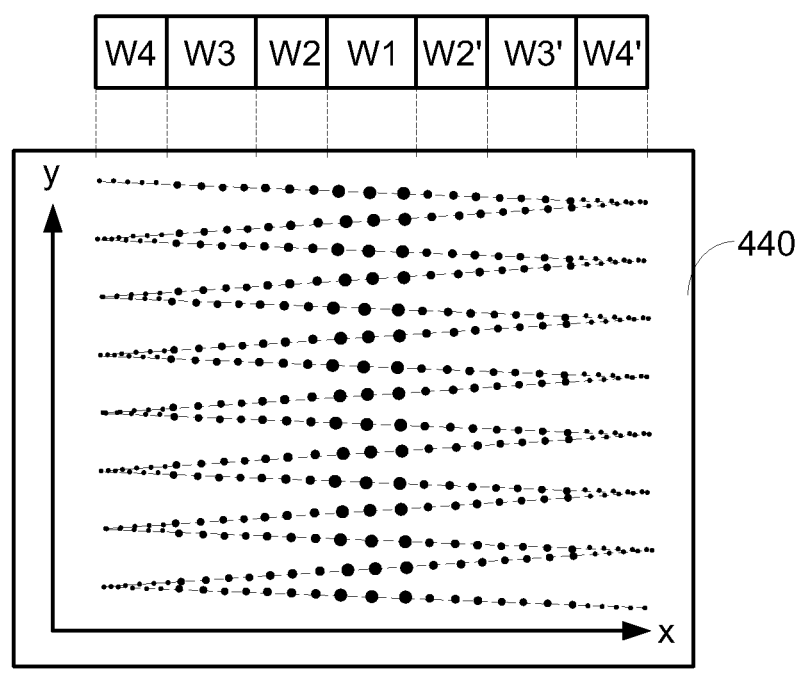
FIG. 5 schematically illustrates the horizontal position-and-weight mapping relationship and the corresponding frame.

FIG. 5 schematically illustrates the horizontal position-and-weight mapping relationship and the corresponding frame. Generally, in case that the distribution of the projection points is sparser, the weight is higher. Whereas, in case that the distribution of the projection points is denser, the weight is lower.

As shown in FIG. 5, the horizontal weight W1 is larger than the horizontal weight W2; the horizontal weight W2 is larger than the horizontal weight W3; and the horizontal weight W3 is larger than the horizontal weight W4 (i.e. W1>W2>W3>W4). Similarly, the horizontal weight W1 is larger than the horizontal weight W2'; the horizontal weight W2' is larger than the horizontal weight W3'; and the horizontal weight W3' is larger than the horizontal weight W4' (i.e. W1>W2'>W3'>W4'). In an embodiment, plural weights are assigned to corresponding projection points according to the distribution of the projection points. In some other embodiment, since the swinging velocities along the horizontal scanning direction X are symmetrical, the horizontal weight W2 is equal to the horizontal weight W2', the horizontal weight W3 is equal to the horizontal weight W3', and the horizontal weight W4 is equal to the horizontal weight W4'.

Moreover, after the weight of the corresponding projection point is acquired according to the horizontal position-and-weight mapping relationship, the weight mapping unit 462 may multiply the image signal V by the corresponding weight in order to generate the compensated image signal Vc. In this embodiment, the weight is a bright weight corresponding to the image signal V. As shown in FIG. 5, the distribution of the projection points at a left side and a right side of the projection surface 440 is denser, and thus the corresponding weights are lower. After the image signal V is multiplied by the corresponding weight to generate the compensated image signal Vc, the brightness setting value corresponding to the compensated image signal Vc is lower (i.e. darker). Whereas, the distribution of the projection points at the middle region of the projection surface 440 is sparser, and thus the corresponding weights are higher. After the image signal V is multiplied by the corresponding weight to generate the compensated image signal Vc, the brightness setting value corresponding to the compensated image signal Vc is higher (i.e. brighter). Since the brightness setting value corresponding to the image signal V is adjusted according to the weight corresponding to the position of the projection point, the brightness of the whole frame displayed on the projection surface 440 is more uniform.

Figure 6A:
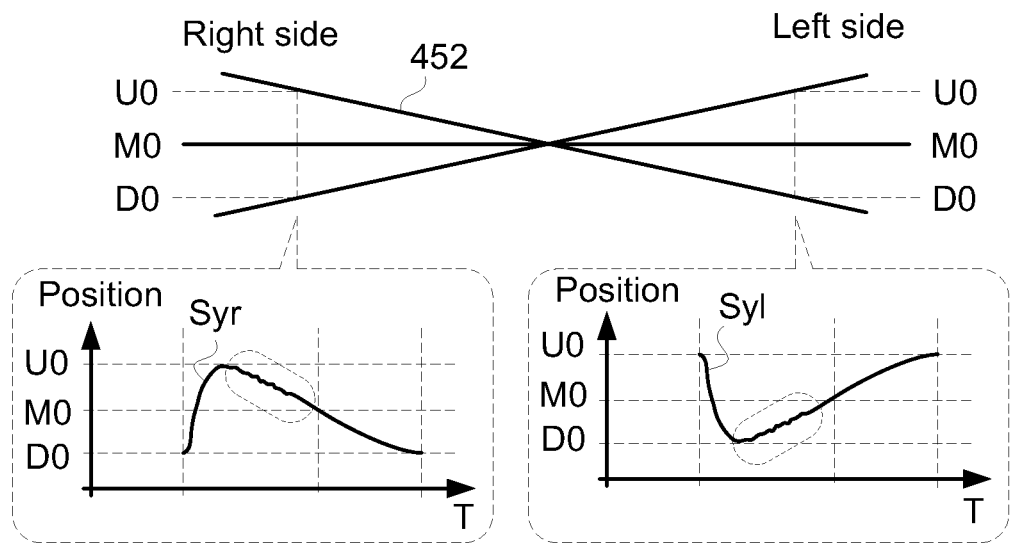
FIG. 6A is a schematic timing waveform diagram illustrating a swinging feedback signal corresponding to the swinging motion of the scanning mirror module along the vertical scanning direction.

FIG. 6A is a schematic timing waveform diagram illustrating a swinging feedback signal corresponding to the swinging motion of the scanning mirror module along the vertical scanning direction. When the scanning mirror module 452 is swung along the vertical scanning direction Y, the right side of the scanning mirror module 452 is firstly swung from top to bottom and then swung from bottom to top, and the left side of the scanning mirror module 452 is firstly swung from bottom to top and then swung from top to bottom. By detecting the swinging feedback signal S in response to the actual swinging motion of the scanning mirror module 452, the scanning projection system 400 may realize the swinging status of the scanning mirror module 452.

As shown in FIG. 6A, the swinging feedback signal S contains a Y-direction right-side swinging feedback signal Syr and a Y-direction left-side swinging feedback signal Syl. According to one of the Y-direction right-side swinging feedback signal Syr and the Y-direction left-side swinging feedback signal Syl, the swing status of the scanning mirror module 452 along the vertical scanning direction Y may be realized. While the right side of the scanning mirror module 452 is swung from the position U0 to the position M0, the swinging feedback signal S of the scanning mirror module 452 is suffered from jitter. Similarly, while the left side of the scanning mirror module 452 is swung from the position D0 to the position M0, the swinging feedback signal S of the scanning mirror module 452 is also suffered from jitter. The jitter of the swinging feedback signal S indicates that a non-constant velocity situation occurs during the process of controlling the scanning mirror module 452 to scan a single frame at a constant velocity along the vertical scanning direction.

Due to the non-constant velocity situation, the distances between the scan lines on the projection surface 440 are not equal, and the scan lines corresponding to the smaller distance present brighter. Consequently, the controlling unit 460 may evaluate the distances between the scan lines along the vertical scanning direction according to the swinging feedback signal S. According to the distribution of the scan lines, the weight mapping unit 462 may derive the position-and-weight mapping relationship. In this embodiment, the distance between adjacent scan lines indicates the distance between adjacent projection points along the vertical scanning direction.

Figure 6B:
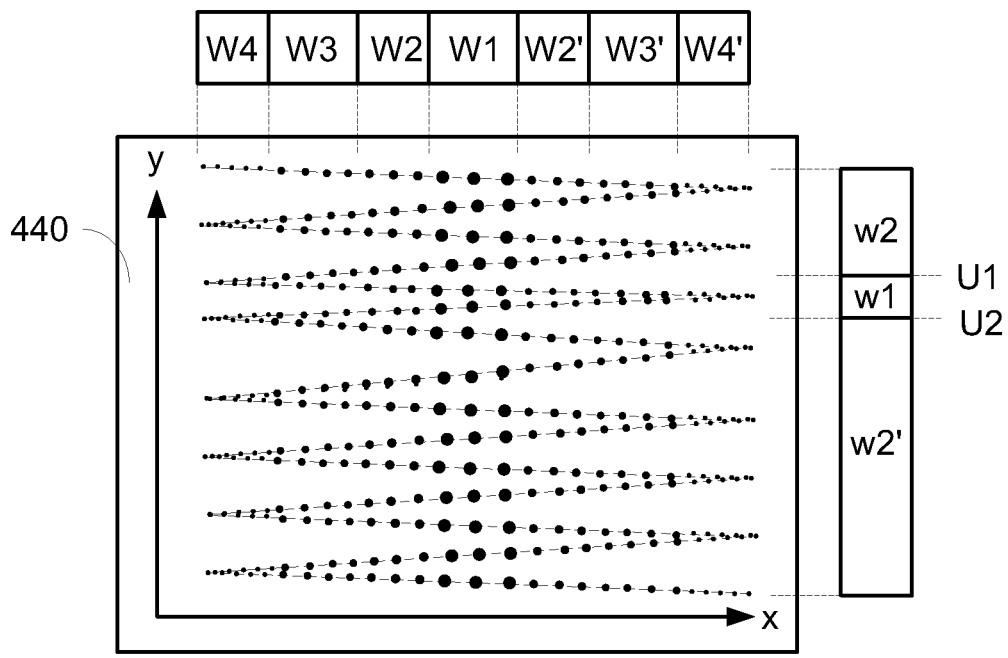
FIG. 6B schematically illustrates the vertical position-and-weight mapping relationship and the corresponding frame.

FIG. 6B schematically illustrates the vertical position-and-weight mapping relationship and the corresponding frame. Generally, in case that the distribution of the projection points or the scan lines along the vertical scanning direction is sparser, the weight is higher. Whereas, in case that the distribution of the projection points or the scan lines along the vertical scanning direction is denser, the weight is lower. In an embodiment, plural weights are assigned to corresponding projection points according to the distribution of the projection points or the scan lines. As shown in FIG. 6B, according to the Y-direction right-side swinging feedback signal Syr, the scan lines between the position U1 and the position U2 is denser than the scan lines at other positions. Consequently, according to the settings of the weight mapping unit 462, the vertical weight w1 is smaller than the vertical weight w2, and the vertical weight w1 is smaller than the vertical weight w2'.

Moreover, after the weight of the corresponding projection point is acquired according to the vertical position-and-weight mapping relationship, the weight mapping unit 462 may multiply the image signal V by the corresponding weight in order to generate the compensated image signal Vc. In this embodiment, the weight is a bright weight corresponding to the image signal V. As shown in FIG. 6B, the distribution of the scan lines between the position U1 and the position U2 of the projection surface 440 is denser, or the distribution of the projection points between the position U1 and the position U2 of the projection surface 440 along the vertical scanning line is denser. Consequently, the corresponding weight w1 is lower. After the image signal V is multiplied by the corresponding weight W1 to generate the compensated image signal Vc, the brightness setting value corresponding to the compensated image signal Vc is lower (i.e. darker). Whereas, the distribution of the projection points at other positions of the projection surface 440 is sparser, and thus the corresponding weight w2 or w2' is higher. After the image signal V is multiplied by the corresponding weight w2 or w2' to generate the compensated image signal Vc, the brightness setting value corresponding to the compensated image signal Vc is higher (i.e. brighter). Since the brightness setting value corresponding to the image signal V is adjusted according to the weight corresponding to the position of the projection point, the brightness of the whole frame displayed on the projection surface is more uniform.

In the above embodiment, the scanning projection system 400 is capable of adjusting the uniformity of the frame brightness along the fast-axis scanning direction and the slow-axis scanning direction. However, those skilled in the art will readily observe that numerous modifications and alterations may be made while retaining the teachings of the invention. For example, in some other embodiments, the uniformity of the frame brightness along one of the fast-axis scanning direction and the slow-axis scanning direction is adjusted. Moreover, in the above embodiment, the weight mapping unit 462 may derive the position-and-weight mapping relationship and the weights according to the scanning trajectory and/or the swinging feedback signal S, and realize the weight of the corresponding projection point according to this relationship. After the image signal V is multiplied by the corresponding weight to generate the compensated image signal Vc, the uniformity of the frame brightness may be adjusted.

In case that the uniformity of the frame brightness along both of the fast-axis scanning direction and the slow-axis scanning direction is adjusted, the weight mapping unit 462 may simulate the scanning trajectory of the combined laser beam 454 that is reflected by the scanning mirror module 452 and projected on the projection surface 440. According to the scanning trajectory, the weight mapping unit 462 may derive the position-and-weight mapping relationship. In addition, the weight of the corresponding projection point is realized according to the relationship. The scanning trajectory of the combined laser beam 454 that is reflected by the scanning mirror module 452 and projected on the projection surface 440 is usually a continuous trajectory varying with time. In other words, the positions of all projection points may be acquired according to the relationship between the scanning trajectory and time, and the position-and-weight mapping relationship is determined according to the closeness or sparseness of each projection point relative to the neighboring projection points. In the above embodiment, each projection point has corresponding weights along the horizontal scanning direction and the vertical scanning direction. According to the corresponding weights, the non-uniform presentation resulting from the closeness or sparseness of the projection points along the horizontal scanning direction and the vertical scanning direction will be compensated. Consequently, the brightness of the whole frame displayed on the projection surface 440 is more uniform.

Moreover, the position-and-weight mapping relationship may be previously established and calibrated before the scanning projection system leaves the factory, and the position-and-weight mapping relationship is recorded into the weight mapping unit 462. Alternatively, during operations of the scanning projection system, the position-and-weight mapping relationship is dynamically changed by the weight mapping unit 462 according to the practical operations of the scanning mirror module 452.

For example, a first projection point, a second projection point, a third projection point and a fourth projection point are sequentially projected on the projection surface 440 by the scanning mirror module 452. If the distance between the first projection point and the second projection point is larger than the distance between the third projection point and the fourth projection point, the weight mapping unit 462 may multiply the image signal V corresponding to the first projection point and the second projection point by a first weight, and the weight mapping unit 462 may multiply the image signal V corresponding to the third projection point and the fourth projection point by a second weight. The second weight is smaller than the first weight. Consequently, the brightness setting value corresponding to the first projection point and the second projection point is larger than the brightness setting value corresponding to the third projection point and the fourth projection point. After the non-uniformity of the brightness resulting from the closeness or sparseness of the projection points is compensated, the brightness of the whole frame displayed on the projection surface 440 is more uniform.

In another embodiment, the closeness or sparseness of the scan lines is taken into consideration. For example, a first scan line, a second scan line, a third scan line and a fourth scan line are sequentially projected on the projection surface 440 by the scanning mirror module 452. If the distance between the first scan line and the second scan line is larger than the distance between the third scan line and the fourth scan line, the weight mapping unit 462 may multiply the image signal V corresponding to the projection points of the first scan line and the second scan line by a first weight, and the weight mapping unit 462 may multiply the image signal V corresponding to the projection points of the third scan line and the fourth scan line by a second weight. The second weight is smaller than the first weight. Consequently, the brightness setting value corresponding to the first scan line and the second scan line is larger than the brightness setting value corresponding to the third scan line and the fourth scan line. After the non-uniformity of the brightness resulting from the closeness or sparseness of the scan lines is compensated, the brightness of the whole frame displayed on the projection surface 440 is more uniform.

From the above descriptions, the present invention provides a scanning projection system. The scanning projection system is capable of producing a frame with uniform brightness.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanning projection system for displaying a frame on a projection surface, the scanning projection system comprising:
    a scanning mirror module, wherein a swinging motion of the scanning mirror module is controlled according to a driving signal, and a combined laser beam reflected by the scanning mirror module is swept across a projection surface to produce plural projection points on the projection surface;
    a controlling circuit comprising a weight mapping unit for converting an image signal into a compensated image signal according to a position-and-weight mapping relationship; and
    a laser module for generating the combined laser beam according to the compensated image signal,
    wherein after plural weights of the corresponding projection points are acquired according to positions of the corresponding projection points and the position-and-weight mapping relationship, the weight mapping unit multiplies the image signal by the corresponding weights according to the positions of the projection points to generate the compensated image signal,
    wherein the plural projection points constitute a first scan line, a second scan line, a third scan line and a fourth scan line sequentially, wherein if a distance between the first scan line and the second scan line is larger than a distance between the third scan line and the fourth scan line, the image signal corresponding to the projection points of the first scan line and the second scan line is multiplied by a first weight, and the image signal corresponding to the projection points of the third scan line and the fourth scan line is multiplied by a second weight, wherein the second weight is smaller than the first weight.

2. The scanning projection system as claimed in claim 1, wherein the plural projection points comprise a first projection point, a second projection point, a third projection point and a fourth projection point, which are sequentially projected on the projection surface, wherein if a distance between the first projection point and the second projection point is larger than a distance between the third projection point and the fourth projection point, the image signal corresponding to the first projection point and the second projection point is multiplied by a first weight, and the image signal corresponding to the third projection point and the fourth projection point is multiplied by a second weight, wherein the second weight is smaller than the first weight.

3. The scanning projection system as claimed in claim 2, wherein the plural weights are brightness weights corresponding to the image signal, wherein a brightness setting value corresponding to the first projection point and the second projection point is larger than a brightness setting value corresponding to the third projection point and the fourth projection point.

4. The scanning projection system as claimed in claim 1, wherein the scanning mirror module further issues a swinging feedback signal to the controlling circuit, wherein the position-and-weight mapping relationship is determined by the controlling circuit according to the swinging feedback signal.

5. The scanning projection system as claimed in claim 1, wherein the position-and-weight mapping relationship is determined by the controlling circuit according to a scanning trajectory of the combined laser beam which is reflected by the scanning mirror module and projected on the projection surface.

6. The scanning projection system as claimed in claim 1, wherein the position-and-weight mapping relationship is determined by the controlling circuit according to a distribution of the positions of the plural projection points.

7. The scanning projection system as claimed in claim 1, wherein the position-and-weight mapping relationship contains at least one of a horizontal position-and-weight mapping relationship and a vertical position-and-weight mapping relationship.

8. The scanning projection system as claimed in claim 1, wherein the plural weights are brightness weights corresponding to the image signal, wherein a brightness setting value corresponding to the first scan line and the second scan line is larger than a brightness setting value corresponding to the third scan line and the fourth scan line.

9. The scanning projection system as claimed in claim 1, wherein the laser module comprises:
    plural color laser sources for emitting plural color beams according to the compensated image signal; and
    plural optical alignment elements for mixing the plural color beams as the combined laser beam.

* * * * *